United States Patent
Rao et al.

(10) Patent No.: US 12,139,096 B2
(45) Date of Patent: Nov. 12, 2024

(54) ROTARY LAP BELT SHACKLE ASSEMBLY

(71) Applicant: B/E Aerospace, Inc., Winston-Salem, NC (US)

(72) Inventors: Sreekanth Rao, Bangalore (IN); Pradeep Acharya, Bangalore (IN); Mark B. Dowty, Rural Hall, NC (US); Maxime Dempah, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 11 days.

(21) Appl. No.: 18/199,179

(22) Filed: May 18, 2023

(65) Prior Publication Data

US 2024/0042960 A1 Feb. 8, 2024

(30) Foreign Application Priority Data

Aug. 4, 2022 (IN) .............................. 202241044597

(51) Int. Cl.
*B64D 11/06* (2006.01)
*B60R 22/12* (2006.01)
*B60R 22/30* (2006.01)

(52) U.S. Cl.
CPC .............. *B60R 22/30* (2013.01); *B60R 22/12* (2013.01); *B64D 11/062* (2014.12)

(58) Field of Classification Search
CPC ...... B64D 11/062; B64D 25/00; B64D 25/02; B64D 25/04; B60R 22/12; B60R 22/28; B60R 22/30
See application file for complete search history.

(56) References Cited

U.S. PATENT DOCUMENTS

| | | | |
|---|---|---|---|
| 3,089,564 A | 5/1963 | Smittle | |
| 3,438,674 A * | 4/1969 | Booth | B60R 22/28 280/805 |
| 3,868,143 A | 2/1975 | Reilly | |
| 4,718,719 A | 1/1988 | Brennan | |
| 5,039,168 A | 8/1991 | Baymak et al. | |
| 5,558,301 A | 9/1996 | Kerdoncuff et al. | |

(Continued)

FOREIGN PATENT DOCUMENTS

| | | |
|---|---|---|
| CN | 205554601 U | 9/2016 |
| CN | 207759039 U | 8/2018 |

(Continued)

OTHER PUBLICATIONS

European Search Report dated Jan. 11, 2024; European Application No. 23189845.3.

(Continued)

*Primary Examiner* — James A English
(74) *Attorney, Agent, or Firm* — Suiter Swantz IP (57) ABSTRACT

A rotary lap belt energy attenuator for reducing inertial loads on seat components. In embodiments, a shackle assembly includes a seat frame component, a shackle pivotally attached to the seat component and attachable to a lap belt component, a deformable link attached to the shackle and the seat component, an attachment guide configured to travel along the guideway, and an energy attenuator positioned in the guideway. In use, each of the deformable link and the energy attenuator undergo plastic deformation during rotary motion of the shackle to attenuate impact energy.

15 Claims, 6 Drawing Sheets

(56) References Cited

U.S. PATENT DOCUMENTS

| | | | |
|---|---|---|---|
| 6,106,013 A | | 8/2000 | Doty et al. |
| 6,478,256 B1 | * | 11/2002 | Williamson ....... B60N 2/42709 |
| | | | 297/216.14 |
| 6,749,224 B1 | | 6/2004 | Stojanovski |
| 7,222,916 B2 | | 5/2007 | Wilde et al. |
| 8,641,096 B1 | * | 2/2014 | Kohlndorfer ........... B60R 22/28 |
| | | | 280/805 |
| 9,399,518 B2 | | 7/2016 | Cecinas et al. |
| 9,714,097 B1 | | 7/2017 | Sirous et al. |
| 10,604,259 B2 | | 3/2020 | Browning et al. |
| 10,857,969 B2 | | 12/2020 | Battlogg |
| 2005/0269452 A1 | | 12/2005 | Wakefield |
| 2006/0103191 A1 | | 5/2006 | Wilde et al. |
| 2008/0231092 A1 | | 9/2008 | Silva |
| 2010/0263176 A1 | | 10/2010 | Lee et al. |
| 2011/0133539 A1 | | 6/2011 | Shoji et al. |
| 2012/0119415 A1 | | 5/2012 | Seale |
| 2012/0138745 A1 | * | 6/2012 | Marais ................. B60N 2/2209 |
| | | | 244/122 R |
| 2013/0009430 A1 | | 1/2013 | Islam et al. |
| 2014/0239683 A1 | | 8/2014 | Marini et al. |
| 2014/0361586 A1 | * | 12/2014 | Fornecker ............... B64D 11/06 |
| | | | 297/216.1 |
| 2015/0360591 A1 | | 12/2015 | Röll et al. |
| 2016/0318612 A1 | | 11/2016 | Deevey et al. |
| 2020/0062149 A1 | * | 2/2020 | Sekizuka ............... B60R 22/26 |
| 2021/0146879 A1 | | 5/2021 | Akoma et al. |

FOREIGN PATENT DOCUMENTS

| | | | | |
|---|---|---|---|---|
| CN | 112027093 A | | 12/2020 | |
| DE | 3733611 A | * | 4/1989 | ........... B60R 22/185 |
| DE | 3902728 A1 | | 8/1990 | |
| DE | 10032572 A1 | | 1/2002 | |
| DE | 102019129094 B4 | * | 8/2023 | ............. B60R 22/28 |
| EP | 0909684 A3 | | 4/2001 | |
| EP | 1094240 A2 | | 4/2001 | |
| EP | 2813430 A1 | | 12/2014 | |
| EP | 3354571 A1 | | 8/2018 | |
| EP | 3388343 A1 | | 10/2018 | |
| GB | 2498465 A | * | 7/2013 | ........... B60N 2/2812 |
| IL | 231791 A | | 12/2014 | |
| IN | 201001045 P3 | | 5/2010 | |
| IN | 201107933 | | 10/2011 | |
| RU | 2095289 C1 | | 11/1997 | |
| RU | 2587131 C2 | | 6/2016 | |
| RU | 2721037 C2 | | 5/2020 | |
| SU | 1327435 A1 | | 3/1992 | |
| SU | 1336436 A1 | | 3/1992 | |
| WO | 1991007315 A1 | | 5/1991 | |
| WO | 1992005072 A1 | | 4/1992 | |

OTHER PUBLICATIONS

A. Praveen Kumar et al., Deformation Studies on the Significance of Combined Geometry Tubes as Energy Absorbing Structures, Intl Journal of Civil Engineering and Technology, vol. 10, Issue 04, Apr. 2019, pp. 1442-1450, https://www.semanticscholar.org/paper/DEFORMATION-STUDIES-ON-THE-SIGNIFICANCE-OF-COMBINED-Kumar/77fe315c453c8e8ad4fe47c0f462b45857ea5008.

Alvian Iqbal Hanif Nasrullah, et al. "Design and optimization of crashworthy components based on lattice structure configuration," Elsevier, Structures 26 (2020) 969-981; https://www.sciencedirect.com/science/article/abs/pii/S2352012420302113?fr=RR-2&ref=pdf_download&rr=71be25cecb556363.

Carlo Boursier et al. "Experimental and Numerical Investigation of a Lattice Structure for Energy Absorption: Application to the Design of an Automotive Crash Absorber," https://www.mdpi.com/2073-4360/14/6/1116/pdf?version=1646981990.

* cited by examiner

ROTARY LAP BELT SHACKLE ASSEMBLY

CROSS-REFERENCE TO RELATED APPLICATION

This nonprovisional application claims the benefit of priority of Indian Patent Application Number 202241044597 filed Aug. 4, 2022 for "ROTARY LAP BELT SHACKLE ASSEMBLY," which is hereby incorporated by reference in its entirety.

TECHNICAL FIELD AND BACKGROUND

The present disclosure relates generally to lap belt energy absorbers, and more particularly to a rotary lap belt shackle assembly configured to limit inertial loads on seat structures.

Lap belts are designed to prevent serious injury during a sudden deceleration event. Basic lap belts attach to seat structures using rigid links. In the event of a sudden deceleration, for instance a crash, inertial loads on the seat occupant are transferred through the rigid link to the seat structure early in the deceleration. To avoid component failure, seat structures must be capable of withstanding high impact loads, and therefore must be substantial and reinforced. To alleviate the performance requirements of seat structures, complex lap belt inertia reels can be used which include internal energy absorbers. While effective at attenuating inertial loads, to a degree, specialized inertia reels add complexity and cost to the seat and are prone to failure.

Therefore, what is needed is a lap belt energy absorber that broadly enhances occupant safety, and which obviates the need for complex inertia reels and provides an opportunity to further optimize seat components.

BRIEF SUMMARY

Broadly speaking, the present disclosure is directed to embodiments of rotating seat belt shackles. Shackle rotation is limited by a deformable link that acts in conjunction with a deformable lattice structure. At lower inertial loads from lower accelerations (e.g., 9 g) the rotary lap belt shackle acts as a rigid link. Once the inertial load reaches an equivalent force value at greater accelerations (e.g., 14 g limit load) the rotary lap belt shackle begins its stroke within a guided path and absorbing energy by straightening a deformable link and crushing a lattice structure. The rotary motion equipped with a predictable failure mechanism helps in attenuating impact energy with minimum occupant displacement. Minimum occupant displacement may mean lesser head path potentially resulting in lower head impact criteria (HIC) values.

Benefits of the rotary seat belt shackle embodiments disclosed herein include, but are not limited to, limiting the inertial loads that the occupant applies to the seat structure in a crash thereby preventing ultimate failure of seat structures, the ability to achieve weight reduction in seat frames, and improvements to occupant safety through a reduction of the occupant lap belt load.

To achieve the foregoing and other advantages, in a first aspect the present disclosure provides a lap belt shackle assembly including a seat component defining a guideway such as an arcuate guideway, a shackle pivotally attached at one end to the seat component and attachable at an opposing end to a lap belt component, a deformable link attached at one end to the shackle and at an opposing end to the seat component, a guide attached to at least one of the deformable link and the shackle, the guide configured to travel along the guideway, and an energy attenuator positioned in the guideway. In use, when a predetermined threshold inertial load is met, each of the deformation link and the energy attenuator is configured to undergo plastic deformation as the guide travels along the guideway.

In some embodiments, the energy attenuator is configured to undergo plastic deformation when a predetermined threshold inertial load is met to permit initial movement of the guide along the arcuate guideway, and the deformable link is configured to undergo plastic deformation during continued movement of the guide along the guideway.

In some embodiments, the deformable link is configured to undergo plastic deformation when a predetermined threshold inertial load is met to permit initial movement of the guide along the arcuate guideway, and the energy attenuator is configured to undergo plastic deformation during continued movement of the guide along the guideway.

In some embodiments, the deformable link is a unitary structure including a first portion and a second portion at an angle to the first portion, wherein the angle between the first and second portions is configured to increase (i.e., the link "straightens") as the guide moves along the guideway.

In some embodiments, the energy absorber is an additively manufactured lattice structure.

In some embodiments, the lattice structure comprises a variable density.

In some embodiments, the shackle comprises a linear portion formed between the one end and the opposing end and a lateral projection positioned along one side of the linear portion substantially centered between the one end and the opposing end, and wherein the guide is received through an opening formed in the lateral projection.

In some embodiments, the seat component is a spreader, the shackle is positioned on an outboard side of the spreader, and the deformable link is positioned outboard of the shackle.

In a further aspect the present disclosure provides an aircraft passenger seat assembly including a spreader attachable to a backrest and at least one transverse beam tube, and a lap belt shackle assembly attached to the spreader. The shackle assembly generally includes a shackle pivotally attached at one end to the spreader and attachable at an opposing end to a lap belt component, a deformable link attached at one end to the shackle and at an opposing end to the spreader, a guide attached to at least one of the deformable link and the shackle, the guide configured to travel along an arcuate guideway formed in the spreader, and an energy attenuator positioned in the arcuate guideway. In use, the shackle assembly acts as a rigid links below a predetermined threshold inertial load value and undergoes plastic deformation (i.e., the deformable link and energy attenuator deform) to attenuate impact energy when the predetermined threshold inertial load value is met.

In some embodiments, in use, the energy attenuator is configured to undergo plastic deformation when a predetermined threshold inertial load is met to permit initial movement of the guide along the arcuate guideway, and the deformable link is configured to undergo plastic deformation during continued movement of the guide along the guideway.

In some embodiments, the deformable link is configured to undergo plastic deformation when a predetermined threshold inertial load is met to permit initial movement of the guide along the arcuate guideway, and the energy attenuator is configured to undergo plastic deformation during continued movement of the guide along the guideway.

In some embodiments, the deformable link and the energy attenuator act in conjunction to attenuate impact force on the spreader.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides embodiments of lap belt shackle assemblies including energy absorbing features. In use, the shackle attaches the lap belt to the seat frame, for instance at an anchor point on a seat spreader. In the absence of impact force of a sufficient threshold value, the shackle acts as a rigid link resisting rotary motion. During impact of a magnitude sufficient to meet a threshold, the shackle undergoes rotary motion to allow a minimal amount of displacement sufficient to attenuate force on the shackle and consequently the connected seat frame. As the shackle rotates, each of a deformable link and an energy attenuator deform to control and slow the rotary motion. As discussed further below, the deformable link and the energy attenuator may work in conjunction or one may function to "unlock" initial rotary motion and thereafter both function to absorb impact energy.

Figure 1A:
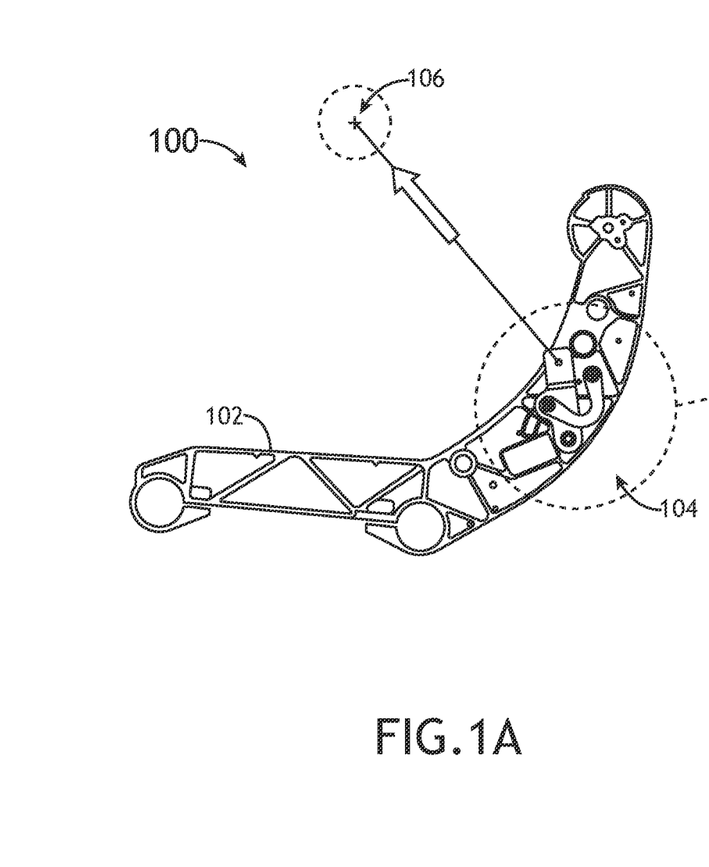
FIG. 1A illustrates a spreader equipped with a rotary lap belt energy attenuator according to an embodiment of the present disclosure.
Figure 1B:
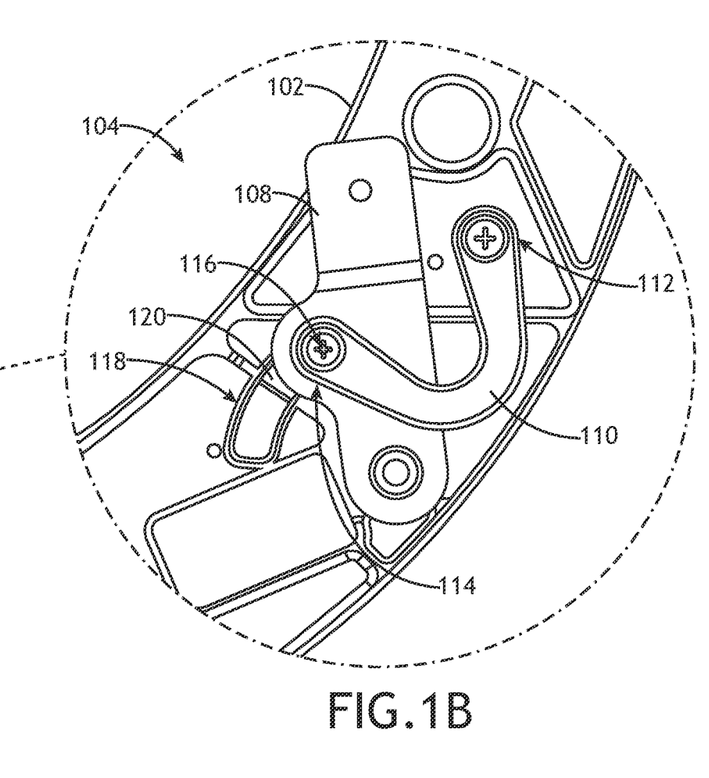
FIG. 1B is a detailed view of FIG. 1A illustrating the rotary lap belt energy attenuator.

FIGS. 1A and 1B illustrates a seat frame assembly 100 according to an embodiment of the present disclosure. The seat frame assembly 100 includes a seat frame element, as shown implemented as a spreader 102, which is a rigid member attachable to transverse beam tubes (e.g., forward and aft transverse beam tubes) and a backrest. In some seat frame platforms, the backrest is pivotably attached to the spreader to permit a degree of backrest recline. In some embodiments, the pivotal attachment end may further attach a pivoting armrest. The seat spreader may be made from metal, composite material or combinations thereof, and in some embodiments is foraminous to save weight. The spreader may further attach legs or legs may attached to the transverse beam tubes.

An energy attenuating lap belt shackle assembly 104, referred to herein as the "shackle" or "shackle assembly," is positioned relative to the spreader at a typical location for lap belt attachment according to the occupant's center of gravity 106. Although not shown, a lap belt typically anchors to spreaders on opposite sides of the seat. Separate parts of the belt attach using a buckle and tongue arrangement. Lap belts are typically size adjustable to accommodate different sized passengers. The shackle assembly 104 includes a shackle 108 pivotally attached at one end to the spreader and attachable at the opposing end to a component of the lap belt. As shown, the shackle 108 has an elongated shape including a linear portion formed between the two opposing ends. A lateral feature extends from one side substantially centered between the two opposing ends. In some embodiments, the shackle 108 is rigid and made of metal. In use, the shackle 108 remains substantially stationary at lower inertial load values from lesser accelerations (e.g., below 14 g), and undergoes rotary motion when a predetermined inertial threshold load value is met or exceeded from greater accelerations (e.g., 14 g).

The shackle assembly 104 further includes a deformable link 110 having a first end 112 attached directly to the spreader 102 and a second end 114 attached to the shackle 108. In some embodiments, the second end 114 is attached to the shackle 108 using a guide 116, such as a pin, bolt or the like, configured to travel or stroke along an arcuate guideway 118 formed in the spreader 102 as discussed further below. In some embodiments, the second end 114 of the deformable link 110 is attached to the lateral feature formed on the shackle 108. In some embodiments, the deformable link 110 is shaped to include a first portion terminating in the first end 112 and a second portion terminating in the second end and angled relative to the first portion. In use, when the shackle 108 rotates, the angle formed between the first and second portions increases, thus causing the link to "open" or "straighten" the link. In some embodiments, the deformable link 110 is a unitary structure made from metal. Threaded screws, bolts and other fastener types and fastening means may be used to attach the deformable link 110 to the assembly.

The shackle assembly 104 further includes an energy attenuator 120 positioned in the guideway 118, for instance an arcuate guideway. In some embodiments, the energy attenuator 120 is implemented as a collapsible lattice structure, which may be made by an additive manufacturing process. In some embodiments, the lattice structure 120 is arcuate shaped to correspond to the arcuate guideway 118 and substantially "fills" the guideway. The lattice structure 120 may be attached to or detached from the spreader 102.

The lattice structure 120 acts in compression to absorb compressive force on the lattice structure from the rotating shackle 108 and attached traveling guide 116 by way of contact with the traveling guide.

In some embodiments, the lattice structure is a variable density lattice structure customizable to absorb impact energy according to, for example, the anticipated average weight of a seat occupant considering the construction of the seat components such as the inboard spreader, outboard spreader, and seat leg. For example, a less porous (i.e., denser) lattice structure may be used to support stiffer seat, whereas a more porous (i.e., less dense) lattice structure may be used to support a less stiff seat. In use, the lattice structure undergoes a structural change when a predetermined threshold load value is met.

Figure 2:
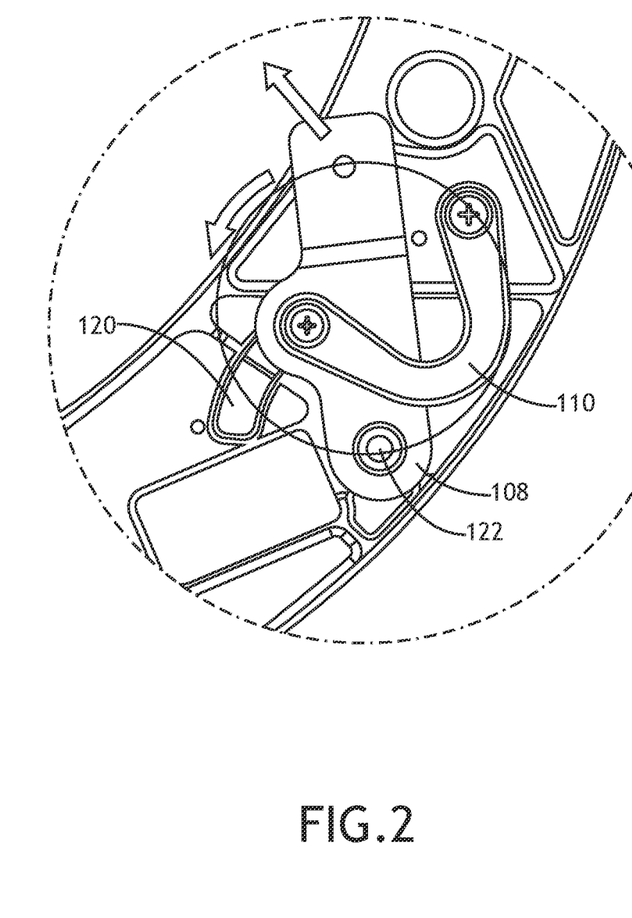
FIG. 2 illustrates rotary motion of the rotary lap belt energy attenuator.

FIG. 2 illustrates center of gravity loading and rotary motion of the shackle 108. As shown, the shackle 108 is positioned in its initial or original position corresponding to standard use in the absence of a threshold meeting load value. When activated, the shackle 108 rotates about the attachment pivot 122 thereby deforming the deformable link and compressing the lattice structure. The deformations may occur in conjunction or sequentially. For example, in some embodiments, lattice structure deformation may occur to release initial rotary motion of the shackle while both features deform during continued rotary motion of the shackle, or vice versa.

Figure 3:
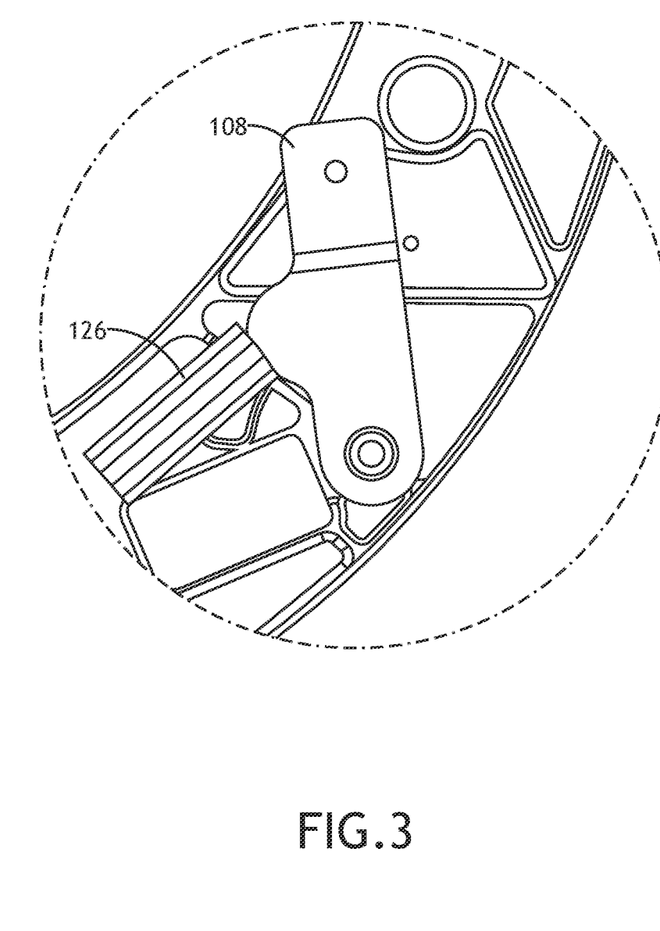
FIG. 3 illustrates a rotary lap belt energy attenuator according to a further embodiment of the present disclosure.

FIG. 3 illustrates the deformable link 110 implemented as a crushable column structure 124 disposed outside of the arcuate guideway and with one column end in direct contact with the shackle 108, for instance the lateral feature formed on the shackle. In use, rotary motion of the shackle causes the column structure 126 to crush utilizing buckling and successive crushing for energy absorption.

Figure 4:
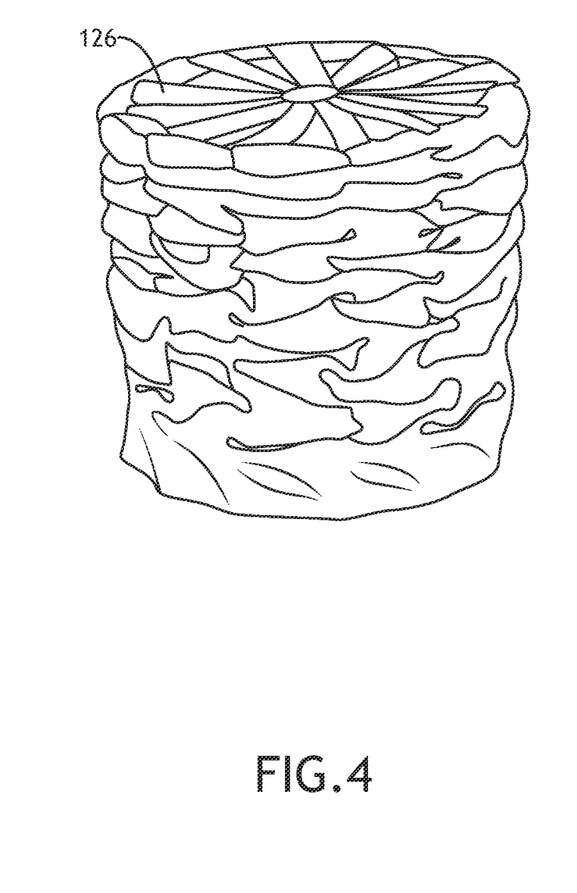
FIG. 4 illustrates a crushed condition of a column structure for use in the rotary lap belt energy attenuator according to the present disclosure.
Figure 5A:
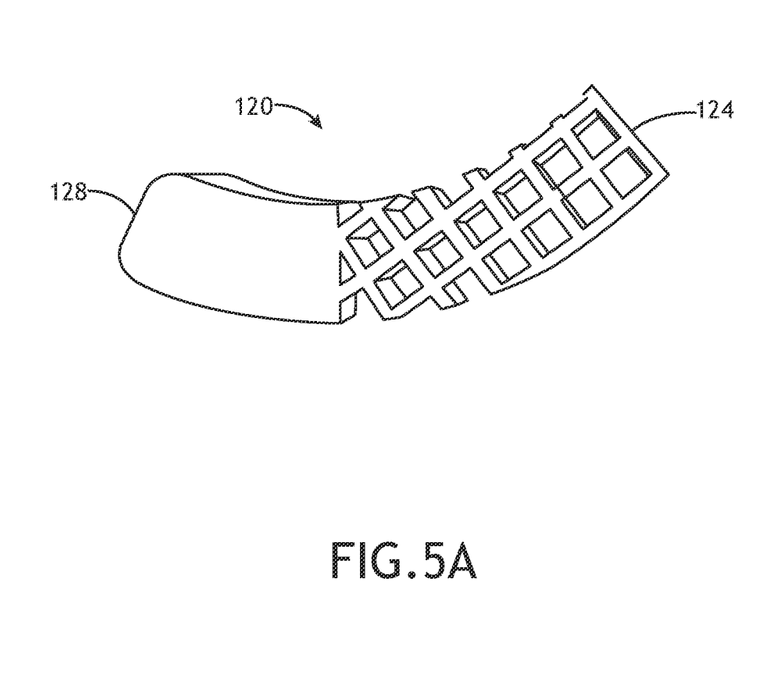
FIG. 5A illustrates an additively manufactured lattice structure for use in the rotary lap belt energy attenuator and shown in an intact condition.
Figure 5B:
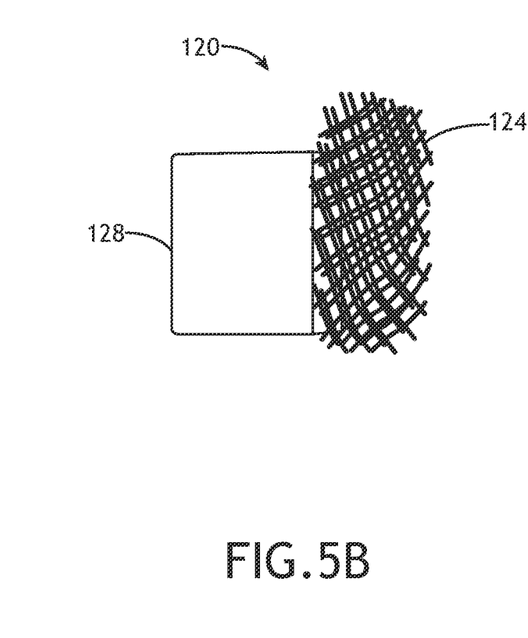
FIG. 5B illustrates the additively manufactured lattice structure of FIG. 5B in a crushed condition.

FIG. 4 illustrates a non-limiting example of the crushable column structure 126 in a crushed condition. The column structure 126 may be made by an additive manufacturing process or by another process. FIGS. 5A and 5B illustrate an additively manufactured energy attenuator including an integrally formed solid portion 128 and the lattice structure 124 extending from one end of the solid portion. The lattice structure 124 is configured to crush utilizing buckling and successive crushing for energy absorption. Like the column structure 126, the lattice structure 124 including its solid end may be made by an additive manufacturing process or by another process, and may have a variable density.

Figure 6:
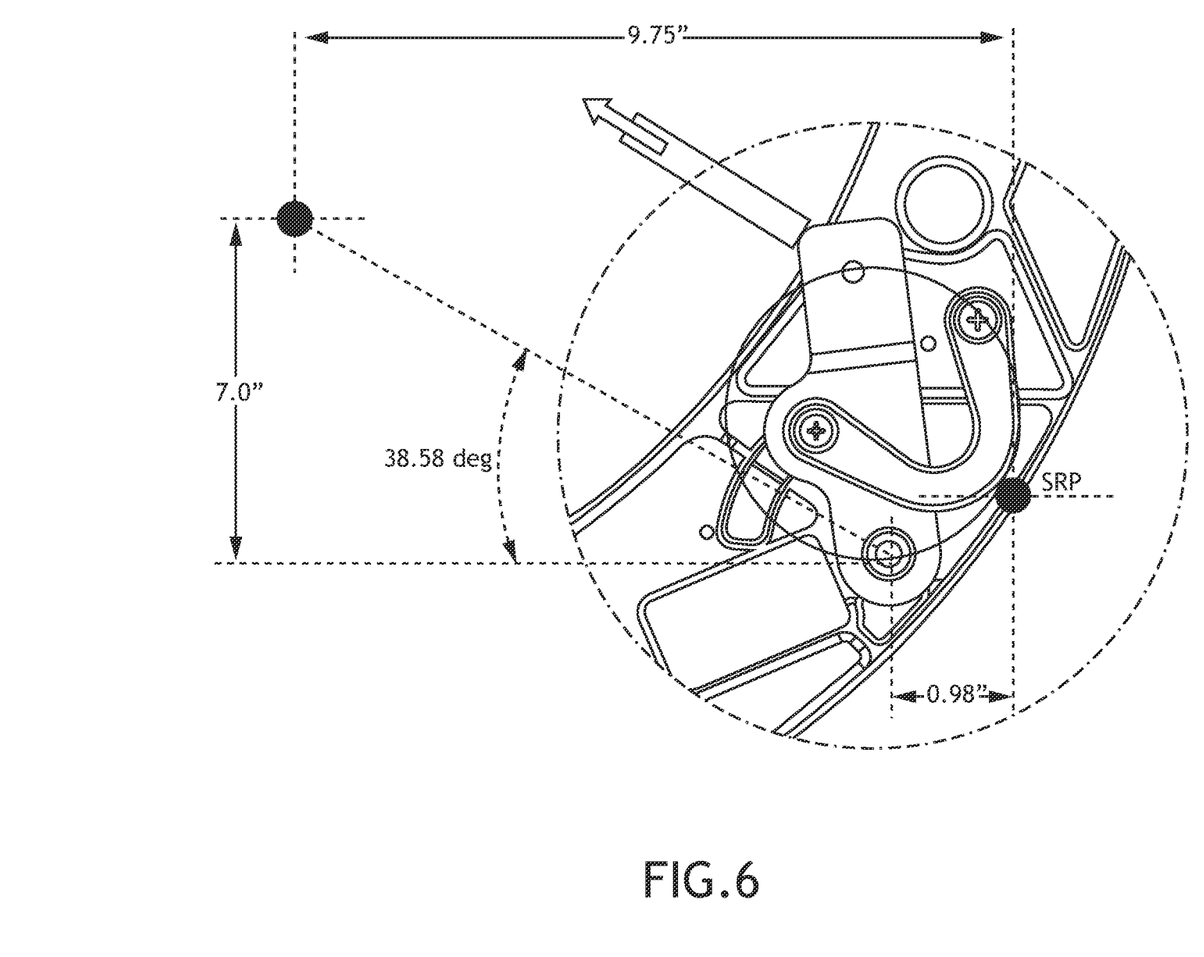
FIG. 6 illustrates rotary lap belt energy attenuator compliance with TSO-C127c.

FIG. 6 illustrates exemplary compliance of the shackle location for the rotary lap belt energy attenuator with Federal Aviation Regulation (FAA) Technical Standard Order (TSO) C127c. Pursuant to TSO-C127c, the pelvic restraint system must be designed such that the vertical angle between the pelvic restraint centerline and the seat reference point (SRP) water line must range from 35 Deg to 55 Deg. FIG. 6 illustrates on example of the SRP water line passing through the SRP parallel to the floor, and the pelvic restraint centerline formed by a line from the pelvic restraint anchorage to a point located approx. 9.75 in (250 mm) forward of the SRP and approx. 7.0 in (180 mm) above the SRP water line. In addition, the pelvic restraint anchorage point is shown located approx. 0.98 in (~25 mm) forward of the SRP, which is less than the maximum allowable distance of 2.0 in (50 mm). FIG. 6 further shows continued compliance with TSO-C127c after deformation and travel of the shackle to the farthest extent of the guideway.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A lap belt shackle assembly, comprising:
   a seat component defining a guideway;
   a shackle pivotally attached at one end to the seat component and attachable at an opposing end to a lap belt component;
   a deformable link attached at one end to the shackle and at an opposing end to the seat component;
   a guide attached to at least one of the deformable link and the shackle, the guide configured to travel along the guideway; and
   an energy attenuator positioned in the guideway;
   wherein at least one of the deformation link and the energy attenuator is configured to undergo plastic deformation as the guide travels along the guideway.

2. The lap belt shackle according to claim 1, wherein the energy attenuator is configured to undergo plastic deformation when a predetermined threshold inertial load is met to permit initial movement of the guide along the guideway, and the deformable link is configured to undergo plastic deformation during continued movement of the guide along the guideway.

3. The lap belt shackle according to claim 1, wherein the deformable link is configured to undergo plastic deformation when a predetermined threshold inertial load is met to permit initial movement of the guide along the guideway, and the energy attenuator is configured to undergo plastic deformation during continued movement of the guide along the guideway.

4. The lap belt shackle assembly according to claim 1, wherein the deformable link is a unitary structure including a first portion and a second portion at an angle to the first portion, wherein the angle between the first and second portions is configured to increase as the guide travels along the guideway.

5. The lap belt shackle assembly according to claim 1, wherein the energy absorber is an additively manufactured lattice structure.

6. The lap belt shackle assembly according to claim 5, wherein the lattice structure comprises a variable density.

7. The lap belt shackle assembly according to claim 1, wherein the shackle comprises a linear portion formed between the one end and the opposing end and a lateral projection positioned along one side of the linear portion substantially centered between the one end and the opposing end, and wherein the guide is received through an opening formed in the lateral projection.

8. The lap belt shackle assembly according to claim 1, wherein the seat component is a spreader, the shackle is positioned on an outboard side of the spreader, and the deformable link is positioned outboard of the shackle.

9. An aircraft passenger seat assembly, comprising:
   a spreader attachable to a backrest and at least one transverse beam tube; and
   a lap belt shackle assembly attached to the spreader, comprising:
      a shackle pivotally attached at one end to the spreader and attachable at an opposing end to a lap belt component;
      a deformable link attached at one end to the shackle and at an opposing end to the spreader;

a guide attached to at least one of the deformable link and the shackle, the guide configured to travel along a guideway formed in the spreader; and an energy attenuator positioned in the guideway;

wherein at least one of the deformable link and the energy attenuator is configured to undergo plastic deformation as the guide travels along the guideway.

10. The aircraft passenger seat assembly according to claim 9, wherein the energy attenuator is configured to undergo plastic deformation when a predetermined threshold inertial load is met to permit initial movement of the guide along the guideway, and the deformable link is configured to undergo plastic deformation during continued movement of the guide along the guideway.

11. The aircraft passenger seat assembly according to claim 9, wherein the deformable link is configured to undergo plastic deformation when a predetermined threshold inertial load is met to permit initial movement of the guide along the guideway, and the energy attenuator is configured to undergo plastic deformation during continued movement of the guide along the guideway.

12. The aircraft passenger seat assembly according to claim 9, wherein the deformable link is a unitary structure including a first portion and a second portion at an angle to the first portion, wherein the angle between the first and second portions is configured to increase as the guide travels along the guideway.

13. The aircraft passenger seat assembly according to claim 9, wherein the energy absorber is an additively manufactured lattice structure.

14. The aircraft passenger seat assembly according to claim 13, wherein the lattice structure comprises a variable density.

15. The aircraft passenger seat assembly according to claim 9, wherein the shackle comprises a linear portion formed between the one end and the opposing end and a lateral projection positioned along one side of the linear portion substantially centered between the one end and the opposing end, and wherein the guide is received through an opening formed in the lateral projection.

* * * * *